Dec. 13, 1960 J. W. BLISS 2,963,998
AGRICULTURAL PLANTER
Filed March 6, 1958 2 Sheets-Sheet 1
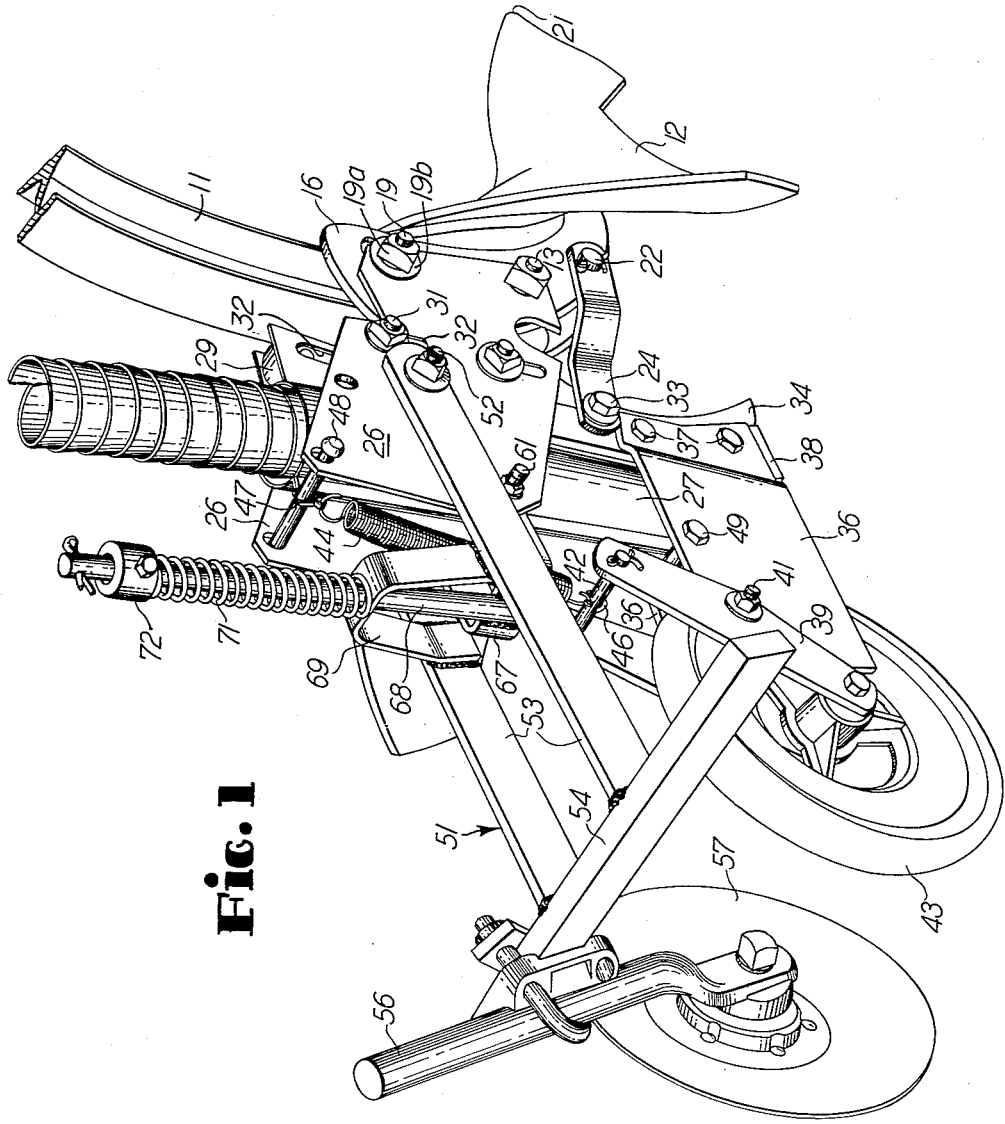
INVENTOR:
JOHN W. BLISS
BY: *Emerson B Donnell*
ATTORNEY Dec. 13, 1960  J. W. BLISS  2,963,998
AGRICULTURAL PLANTER
Filed March 6, 1958  2 Sheets-Sheet 2
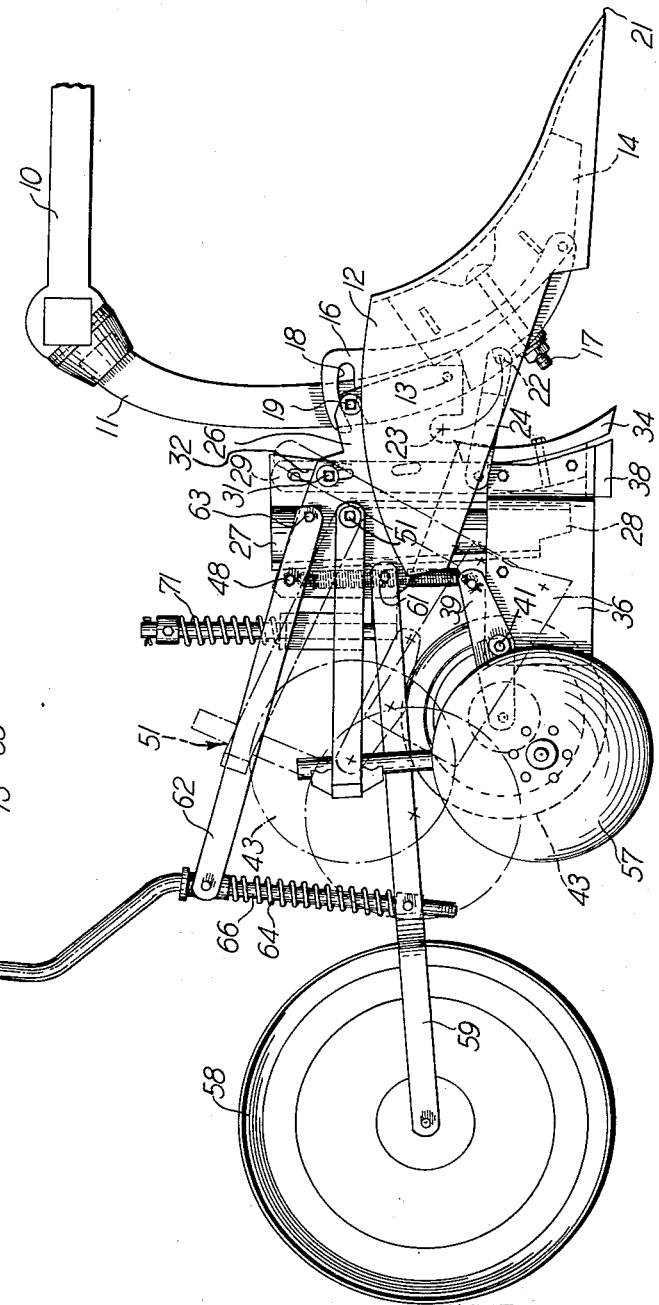
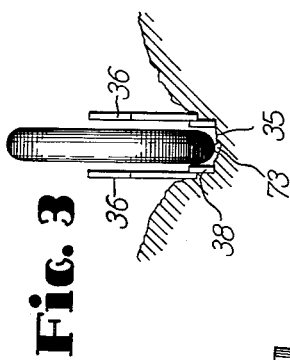
INVENTOR:
JOHN W. BLISS
BY: Emerson B Donnell
ATTORNEY

United States Patent Office 2,963,998
Patented Dec. 13, 1960

2,963,998

AGRICULTURAL PLANTER

John W. Bliss, Rockford, Ill., assignor to J. I. Case Company, Racine, Wis., a corporation of Wisconsin Filed Mar. 6, 1958, Ser. No. 719,657

5 Claims. (Cl. 111—85)

This invention relates to agricultural planters and, more particularly, it relates to an attachment for a lister planter.

It is a general object of this invention to improve the construction and operation of devices of this class and to provide a lister planter which is sturdy in structure and which will deposit seed in the unplowed ground which defines the base of the trench or furrow formed by the planter lister or sub-soiler. In accomplishing this object, it should be kept in mind that the planter is normally lowered to its ground engaging position by means of the supporting hitch arms of the tractor and, upon lowering the planter into ground engagement, it is essential that the planter is not subjected to excessive forces such as those which are normally created if the planter is dropped onto the ground. In the present invention, the critical parts of the planter are so constructed that, if the planter is dropped onto the ground, these parts will not normally be damaged. In conjunction with this, the planter is designed to prepare the furrow in the ground and deposit the seed in the extreme base of the furrow so that the seed is kept moist by being in contact with the unplowed ground and, of course, this is the desired manner of planting. Thus, the planter is so constructed that it will not be readily damaged when dropped onto the ground, and also the parts which provide this protection for the planter are the parts which produce the desired result of planting the seed in the base of the furrow.

Another object of this invention is to provide an attachment for existing types of lister planters wherein the attachment can be readily and easily mounted on existing planters, and the attachment is so arranged that it will accomplish the first-mentioned object.

Still another object of this invention is to provide an attachment for a planter wherein the attachment incorporates means for keeping the furrow base free of plowed soil until the seed is placed in the base of the furrow, and it also includes a resiliently mounted press wheel, all so arranged that when the lister trips upon engaging an obstacle in the ground, the attachment, along with other parts of the planter, will also trip or pivot to avoid being damaged by striking the obstacle as the planter is advanced over the ground.

Other objects and advantages will become apparent from the following description in light of the accompanying drawings, wherein:

Fig. 1 is a rear perspective view of a planter incorporating a preferred embodiment of this invention and with parts broken away and parts removed.

Fig. 2 is a side elevational view of the planter shown in Fig. 1 but with parts in slightly different positions and with parts added and also showing, in dot-dash lines, certain parts in the pivoted position.

Fig. 3 is a front elevational view of the planter press wheel and side shields and showing the furrow and a seed.

The same reference numerals refer to the same parts throughout the specification and the several views.

The drawings show a planter which is normally attached to the rear end of a tractor (not shown) with the usual tractor hitch arm 10 being connected in any suitable manner to the planter beam 11 so that the beam 11 is supported in a depending position and, because the hitch arm 10 can pivot up and down, the beam 11 is free to swing upwardly with the same. The lower end of the beam 11 supports a lister 12 in a manner that the latter is pivotal on the beam 11 about the pivot point 13. The lister type of plow 12 is attached to the beam 11 through a frog 14 which is secured to a footpiece 16 by means of a bolt 17 the whole constituting a frog structure. The footpiece 16 is shown in the drawings to be the member which is pivoted on the beam 11, and the footpiece has a hook portion 18 which is open toward the rear of the planter and engages a stationary clamping bolt 19 on the beam 11 to secure the footpiece 16 against counter-clockwise rotation on the beam 11, clamping bolt 19 as clearly shown in Fig. 1, having a nut 19$^a$ engaging a washer 19$^b$ and thereby forcing hook portion 18 into frictional clamping contact with beam 11 while allowing the footpiece to rotate clockwise about the pivot 13 in the event of the development of a sufficient force to overcome the clamping effect of nut 19$^a$. As seen in the drawing, a frame member to be later described is interposed between washer 19$^a$ and hook portion 18, but has no substantial effect upon the clamping action. The drawings show the lister 12 to be in a normal plowing position for opening the furrow in the ground. The lowest and leading point 21 of the lister will remain in the relative position shown until such time as the point contacts an obstacle in the ground, and at that time the force developed will be sufficient to overcome the clamping effect of bolt 19 whereupon the entire lister can pivot about the bolt 13 so that the pin 22 on the footpiece 16 can swing to the position indicated by the center mark designated 23. It will be seen that a link or member 24, which is secured at its forward end to the pin 22, will be displaced rearwardly of the planter, and this displacement will induce the desired pivotal movement of the trailing parts of the planter so that they also can avoid the obstacle and also pivot away from the lister when the latter trips as described.

The planter also includes a pair of frame plates 26 which are secured by means of the bolts 19 and 13 to the lower end of the beam 11, and these plates remain in a fixed position and do not pivot with the remainder of the planter. A seed boot or spout 27 is disposed between the plates 26 to extend from a position thereabove to a lower end 28, as shown in Fig. 2. Also, a standard 29 is disposed between the plates 26, and a bolt 31 passes through the plate and the standard 29 to provide the pivot point for the standard and other parts hereinafter described, which parts are attached to the lower end of the standard 29. It will be seen that the pivot bolt 31 passes through an upright slot 32 in each of the plates 26 so that the standard 29 is movable in the upright or vertical direction with respect to the plates 26 so that adjustments, as hereinafter described, can be made in the planter. Referring again to the link 24, it will be seen that the lower portion of the standard 29 is secured by means of a bolt 33 to the rear end of the link 24, and in this arrangement, when the link 24 is displaced rearwardly as described, it will likewise displace or pivot the standard 29 to the dot-dash line position shown in Fig. 2. Also, it should be noted that a sub-soiler or opener 34 is attached to the front and lower end of the standard 29, and the point of the sub-soiler engages the soil in a position slightly below that of the point 21 of the lister to provide a deeper furrow and form the furrow base as indicated at 35 in Fig. 3.

A pair of side shields 36 is secured by bolts 37 to the lower end of the standard 29, and it will be noted that the shields flank the seed spout 27 and embrace the latter while extending to a position below the elevation of the lower end 28 of the spout. Also, the front lower edges of the shields 36 are each provided with a toe plate 38 attached to the shields to be disposed immediately behind the opener 34 to keep the loose soil, plowed by the lister 12 and the opener 34, from falling back into the furrow to cover the base of the furrow before the seed can be deposited through the spout 27 on the hard base 35 of the furrow.

A lever consisting of two lever or rocker arms 39 is pivotally mounted at the rear end of the shields 36 by means of pivot bolts such as bolt 41, and the lever is joined between the arms 39 by a pin 42 at one end of the lever. The rear end of the lever rotatably supports a press wheel 43, which is thus disposed in the upright plane immediately behind the seed spout 27 for pressing the seed firmly into the hard bottom of the furrow as the planter advances. A tension spring 44 is disposed in position to bias the wheel downwardly into firm contact with the ground, the spring being connected at its lower end to a cotter pin 46 which engages the lever pin 42, and at its upper end to a cotter pin 47 which engages a rod 48 extending between the plates 26. Thus, the wheel 43 normally rides on the base 35 of the furrow, which base is horizontally level with the bottom of the sub-soiler 34, and the spring 44 urges the wheel downwardly into firm contact with the ground. It will thus be seen that the wheel 43 is disposed between the shields 36 in close proximity to the seed spout 27, and mounted directly on the shield 36. Also, as mentioned, the wheel is spring biased so that when the planter is dropped, the wheel will merely pivot on its arms or levers 39 to avoid damage to the wheel and its mounting levers. As clearly shown in Fig. 1, lever 39, when the planter is clear of the ground, stands substantially in alignment with tension spring 44, urged into such position by the pull of the spring, the position being sharply upwardly directed so as to present a relatively unfavorable swinging component to the lever upon initial contact of wheel 43 with the ground. Lever 39 therefore exerts a relatively large supporting force momentarily on plates 36, if the planter is dropped on a hard surface, thus dissipating a large part of the shock which would otherwise be imposed on point 34 and lister 12. A bolt 49 connects the shields 36 in a position rearward of the seed spout or boot 27. The shields, the lever, the wheel, the spring, and the sub-soiler described constitute the attachment.

To complete the construction of the planter, a coverer frame 51 Fig. 1 is pivotally mounted on the plates 26 by means of a bolt 52 engaging the frame arms 53, as shown. A cross bar 54 of the frame 51 supports the disc standards 56 so that the two discs 57 are disposed approximately adjacent the press wheel 43 to engage the loose soil plowed by the lister 12 and to replace the soil in the furrow to cover the seed after the wheel 43 has pressed the seed firmly into the ground. The final press wheel 58 is pivotally mounted on the planter through two arms, such as the arm 59 of Fig. 2, and the latter are attached by pivot bolts, such as the bolt 61, to the plates 26. A second pair of arms, such as the arm 62, is rigidly connected to the plates 26 by means of the bolts 63 and the pin 48, and a compression spring 64 is slidable on a crank 66 between the arms 62 and the arms 59 to yieldingly urge the latter downwardly to maintain the press wheel 58 in firm and continuous engagement with the ground as desired. Also, Fig. 1 shows a yoke 67 attached to the plates 26 by means of the bolts 61 so that the yoke is rigid with the plates 26, and a rod 68 is welded to the yoke 67 to extend thereabove as shown. Another yoke 69 is welded to the coverer frame arms 53, and the yoke 69 provides a suitable opening for rod 68 to freely pass therethrough so that a compression spring 71 can bear downward on the yoke 69 as the spring is limited in its upward movement by a collar 72 secured to the rod 68, and thus the spring exerts downward pressure on the coverer frame 51 to urge the discs 57 into firm contact with the ground at all times during planter operation. It will thus be seen that the press wheels 43 and 58 and the discs 57 are all spring urged into firm contact with the ground, and each means for so urging the ground engaging elements is adjustable since the crank 66 and the adjustable collar 72 are provided, and it should also be noticed that the spring 44 can be adjusted simply by changing the length of the cotter pins 46 and 47 which secure the ends of the spring 44. In this latter manner, the resilient urging of the wheel 43 can be readily adjusted without any elaborate parts.

Referring to the pivoting or tripping of the parts described, when the lister 12 trips, the link 24 will be rearwardly displaced as described, and, accordingly, the standard 29 will be pivoted to the dot-dash line position of Fig. 2 so that the side shields 36, and the seed spout 27, will be accordingly pivoted as indicated by the dot-dash lines representing the side shields 36. This also causes the lever 39 to be displaced, and thus the wheel 43 is raised to its dot-dash position, and the wheel engages the cross bar 54 of the coverer frame to raise the coverer frame to the dot-dash line position shown. In this manner, all of the parts of the planter which are normally disposed close to the ground are pivoted upwardly so that these parts will not be damaged by the obstruction which was engaged by the lister 12.

Also, as previously mentioned, it is important that the seed be deposited in the base of the furrow which is the hard ground over which the lister 12 and the sub-soiler 34 have been moved. Thus, as shown in Fig. 3, the seed indicated at 73 will be deposited on the hard ground, and the following press wheel 43 will press the seed at least partially into the hard ground. Then the discs 57 and final press wheel 58 will position the soil over the seed and in the furrow. Since the seed is deposited directly onto the hard ground, capillary action of moisture in the ground will reach the seed more completely and rapidly than it would if the seed were in loose soil. With this improvement in the capillary action, germination of the seed is hastened, and improved results are achieved. With the sub-soiler 34 disposed slightly below the lowest point, such as the point 21 of the lister 12, and with the side shields 36 and their toe plates 38 disposed immediately behind the sub-soiler 34 and flanking the lower end of the seed spout 27, the loose soil will not get back to the base of the furrow before the seed has been dropped through the spout 27 nor before the press wheel 43 can roll over the seed and press it into firm imbedded contact in the hard, unplowed soil.

While a specific embodiment of this invention has been shown and described, it should be obvious that certain changes could be made therein, and the scope of this invention should, therefore, be limited only by the appended claims.

What is claimed is:

1. In an attachment for a planter of the type including a beam attachable to a tractor providing for raising and lowering movement of said beam, the combination of a lister pivotally attached to said beam for rearward swinging upon engagement with an obstacle, a sub-soiler, a seed spout and a coverer frame with covering elements all pivotally associated with said beam in positions therebehind, a side shield attached to said sub-soiler for pivotal movement therewith and extending on either side of said seed spout and below the lower end thereof for restraining soil plowed out of a furrow formed by said lister and said sub-soiler from entering said furrow under said shields and for shielding said lower end of said seed spout, a press wheel pivotally mounted on the rear ends of said shields and disposed directly rearward of said seed spout with respect to the direction of planter operation and between said shields, for pressing seed into the base of said furrow as the latter is formed by said sub-soiler, resilient means connected to said press wheel for yieldingly urging the latter downward against said base, and a connection from said lister to said subsoiler and said spout arranged to cause rearward swinging thereof by reason of rearward swinging of said lister, said coverer frame being disposed in interference with the arc of pivotal movement of said press wheel for the latter to engage said coverer frame upon pivotal movement of said side shields and to pivot said coverer frame upwardly.

2. A planter comprising a beam, a lister pivotally attached to said beam for forming a furrow in the ground upon forward movement of said planter and for pivoting in an upright plane upon engaging an obstacle in the ground, a frame member attached to said beam, a sub-soiler pivotally connected to said member and disposed rearward of said lister for movement in said furrow and adapted to form a furrow base, a seed spout connected behind said sub-soiler, pivotal therewith and directly above said furrow base, a link connected between said lister and said sub-soiler in position for transmitting the pivotal movement of said lister to said sub-soiler for swinging said subsoiler back out of the way when said lister pivots by reason of engaging an obstacle, a pair of shields supported at either side of the lower end of said seed spout and being pivotal therewith and disposed proximate the lower edge of said seed spout for momentarily restraining soil from covering said furrow base, and a press wheel pivotally mounted between the ends of said shields rearwardly of said seed spout and disposed at least partly between said shields for pressing seed into said furrow base before loose soil covers said furrow base.

3. A planter comprising a beam, a lister pivotally attached to said beam for forming a furrow in the ground upon forward movement of said planter and for pivoting in an upright plane upon engaging an obstacle in the ground, a member attached to said beam, a standard pivotally attached to said member and disposed rearwardly of said lister, a sub-soiler connected to said standard and disposed rearward of said lister for movement in said furrow and adapted to form a furrow base, a seed spout connected to said standard and pivotal therewith and being disposed therebehind and directly above said furrow base, a link connected between said lister and said standard in a position to transmit the pivotal movement of said lister to said standard for swinging said standard back out of the way when said lister pivots by reason of engaging an obstacle, a pair of shields attached to said standard and supported adjacent the sides of said seed spout at the lower end thereof and pivotal therewith, said plates being disposed proximate the lower edge of said seed spout for restraining soil from covering said furrow base, and a press wheel pivotally mounted between the ends of said shields rearwardly of said seed spout and disposed at least partly between said shields for pressing seed into said furrow base before loose soil covers said furrow base.

4. In a planter the combination of a plow beam, a plow bottom, a frog structure fixed to said plow bottom and having a pivotal connection to said beam in a position to provide for rearward swinging of said plow bottom and frog structure when said bottom encounters an obstacle, means for yieldingly restraining said frog structure against pivotal movement, a frame member on said beam rearwardly of said frog structure, a subsoiler pivoted to said frame member, a seed spout fixed in relation to said subsoiler, arranged to discharge seeds in the path traversed by the subsoiler, and an actuating connection between said frog structure and said subsoiler arranged to prevent rearward swinging of said subsoiler under normal conditions, but to swing it back about its pivotal connection to said frame by reason of rearward swinging of said frog structure, when said plow bottom encounters an obstacle.

5. A planter comprising a beam attachable to a tractor of the type wherein the hitch means supporting said planter can be raised and lowered, a lister mounted on said beam, a seed boot connected to said beam and disposed rearwardly of said lister in an upright position with the lower end thereof substantially at an elevation of the lower portion of said lister, a side shield fixed in relation to said beam on either side of said lower end of said boot, depending therebelow and extending rearwardly thereof with respect to the forward direction of planter operation, a rocker lever pivotally mounted intermediate its ends on the rear ends of said shields, a press wheel rotatably mounted on one end of said lever, and a tension spring connected to the other end of said lever for biasing said press wheel into contact with the ground rearwardly of said seed boot, and said spring being positioned to substantially align with said rocker lever in a substantially upright position so as to place said press wheel with its periphery substantially below the lower edges of said shield when the planter is out of the ground, so as to first contact the ground and receive a major portion of the resulting shock when the planter is dropped.

References Cited in the file of this patent

UNITED STATES PATENTS

| | | |
|---|---|---|
| 1,092,030 | Douglas | Mar. 31, 1914 |
| 1,259,826 | Bloom | Mar. 19, 1918 |
| 2,416,189 | McIntyre | Feb. 18, 1947 |
| 2,629,351 | Wenger | Feb. 24, 1953 |